March 14, 1950 C. A. BUTLER, JR 2,500,601
PIPE SEALER
Filed Jan. 26, 1945
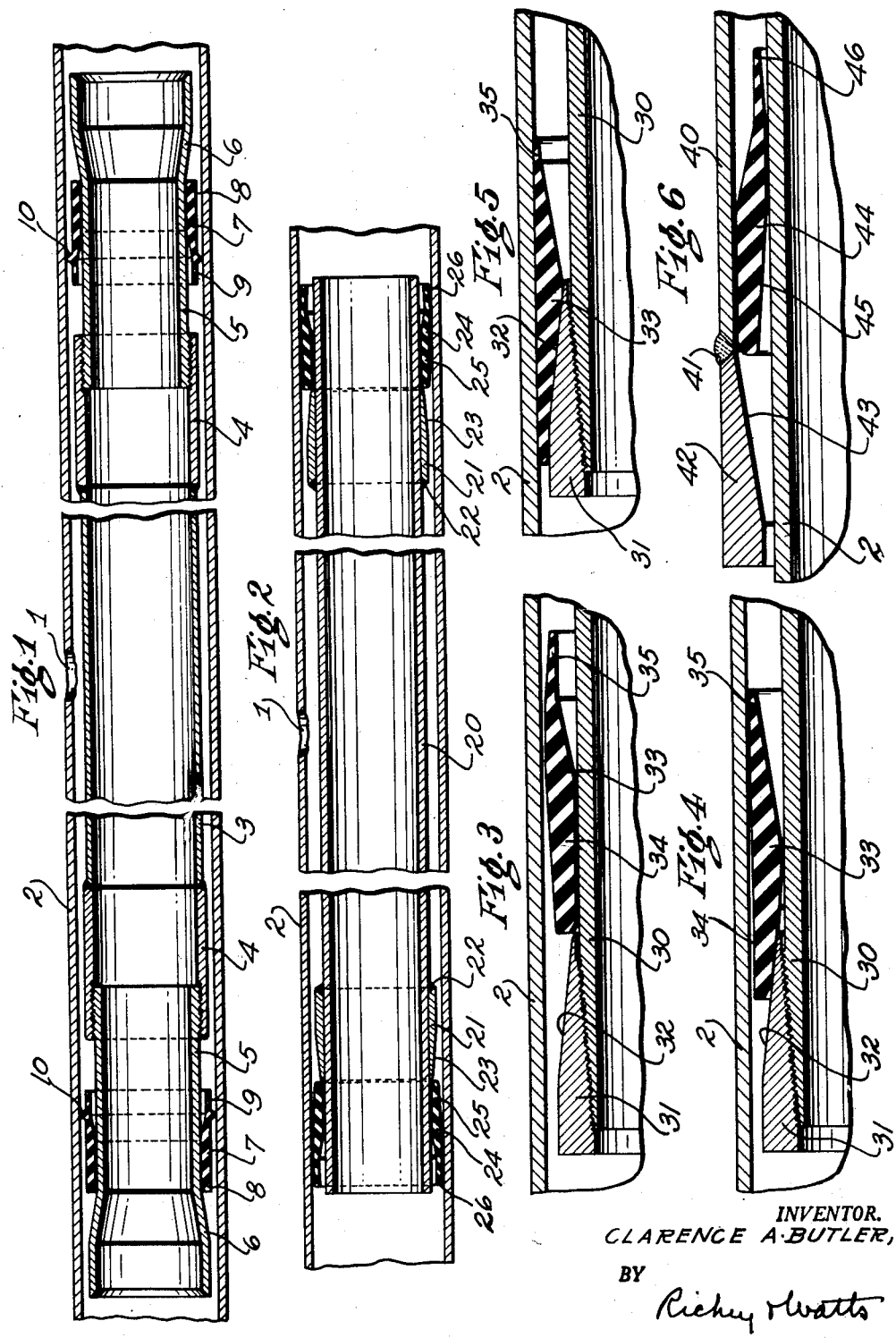
INVENTOR.
CLARENCE A. BUTLER, JR.
BY Richey Watts
ATTORNEYS Patented Mar. 14, 1950

2,500,601

UNITED STATES PATENT OFFICE 2,500,601

PIPE SEALER

Clarence A. Butler, Jr., Painesville, Ohio, assignor to Diamond Alkali Company, Cleveland, Ohio, a corporation of Delaware Application January 26, 1945, Serial No. 574,735

10 Claims. (Cl. 138—91)

The present invention relates generally to fluid seals and more particularly to apparatus for preventing flow of liquid thru holes or perforations in the wall of a pipe.

There are many places where a simple means of sealing holes in the wall of a pipe or vessel against passage of fluid therethru would be of great value. One illustration of such a place is well casing thru which fluids are pumped. Such casing, particularly after long use, often develops leaks through cracks or corroded holes in its side wall. When such leaks occur they may interfere with, or even prevent, the flow of fluid thru the well out of the casing, but if they could be sealed off, the casing could be continued in use for extended periods of time.

The present invention provides simple means which can readily be applied to a pipe or vessel having an opening thru its side wall and which will effectively seal such an opening. The application of differential pressure is used in accomplishing the sealing action of devices embodying this invention.

The present invention will be better understood by those skilled in the art from the following description and the drawings which accompany and form a part of this specification, and in which Figure 1 is a longitudinal, sectional view of a sealing device embodying the present invention assembled in a pipe having an opening thru its side wall and for use where the pressure outside of the pipe is greater than it is within the pipe;

Figure 2 is a longitudinal sectional view showing a modification of parts of the apparatus of Fig. 1 for use in cases where the pressure within the pipe is greater than that outside it;

Figure 3 is a fragmentary, longitudinal sectional view of a modified form of the present invention with the parts shown in initial, non-sealing position;

Figure 4 is a view similar to Fig. 3 showing the relative position of the parts between non-sealing and sealing positions;

Figure 5 is a view similar to Figs. 3 and 4 showing the parts in sealed position;

Figure 6 is a view similar to Fig. 3 showing another modified form of the invention.

In Fig. 1 is shown a device embodying the present invention for use in sealing a hole 1 in the side wall of a pipe 2 thru which hole considerable fluid may flow into the pipe while the level in the pipe is below the level of hole 1. This sealer comprises a tube 3 having sleeves 4 welded thereto. Tubes 5 extend into sleeves 4 and may be secured in place either by a press fit or screw-threaded engagement, or in any other suitable manner. Each tube 5 has a conical surface 6 with its smaller end facing tube 3. Resilient rings 7 snugly fit on the cylindrical portion of tube 5 and have thick portions 8 to engage the conical surfaces 6 and the inner surface of pipe 2 and thin portions 9 which normally lie out of engagement with the cylindrical surface of tube 5 and may be deflected outwardly into close fitting contact with the inner surface of pipe 2.

It will be noted that the rings 7 of Fig. 1 have outwardly projecting ribs 10 on the thin portions 9 thereof. These ribs are an advantage when the rings are used in pipes of slightly varying inside diameter. The rib may be cut away to fit snugly a pipe in which the ring is to be used.

Rings 7 may be composed of natural or synthetic rubber or rubber-like material. Rings composed of a composition including natural rubber useful in the present invention have a tensile strength of 2300 pounds per sq. in., 510% elongation at the break, 800 pounds pull at 300% elongation, and a Shore hardness of 65.

By varying the elasticity of the ring material the rings may be seated between tubes 5 and pipe 2 with pressure which is a small fraction of the pressure required to unseat the rings. Similarly, when the rings are composed of less elastic material the pressure required to unseat them may be only slightly greater than that required to seat them.

In using the apparatus of Fig. 1 the location of opening 1 in pipe 2 is preferably determined approximately. Then the assembled unit consisting of tube 3, sleeves 4, tubes 5, and rings 7, is moved into pipe 2 until rings 7 are located on opposite sides of opening 1. When the pressure within pipe 3 is decreased until it is less than the pressure outside pipe 2, fluid under pressure in the space between pipe 2 and tube 3 will deform the thin portions 9 of rings 7 out into contact with the inner surface of pipe 2 and greatly interfere with, if not actually prevent, flow of liquid past rings 7. Continued application of pressure to rings 7 will move them axially along the conical surfaces 7 of tube 5 and bring them into close fitting contact with the inner surface of pipe 2. Such pressure will wedge the rings into the space between the enlarged portions of tubes 5 and the surrounding surface of pipe 2, which space is suitably of less width than the normal thickness of the thick part of rings 7, and shut off further flow of liquid thru hole 1 of pipe 2. So long as a difference in pressure is maintained between the outside of pipe 2 and the inside of tube 3, rings 7 will effectively seal pipe 2 against flow of liquid thru opening 1. Indeed, when the slope of conical surfaces 6 is at a small angle to the longitudinal center line thereof and the rings 7 are composed of quite elastic material, several times as much pressure may exist inside tube 3 and within pipe 2 beyond the ends of tube 3 as exists outside of pipe 2, without rings 7 being dislodged from their sealing position sufficiently to permit leakage of fluid therepast. By inclining the conical surfaces at steeper angles, or using less elastic rings, or combining these two factors, the amount of pressure required to dislodge rings 7 may be decreased even to the extent where but slightly more pressure is required to unseat these rings than was required initially to seat them.

When the approximate location of the opening thru the side wall pipe 2 is not known, the sealer shown in Fig. 1 may be advanced into pipe 2 for a distance and then the above described differential pressure created. The rings 7 will not be forced into sealing engagement when there is no opening in the side wall of pipe 2 between the rings. If, after application of differential pressure, the sealing unit can be moved in pipe 2, there is no opening I in the pipe 2 between rings 7. The pressure differential may be removed and the sealer moved farther along pipe 2. In this manner a pipe, which is not accessible for location of holes in its side walls, may be explored with resultant location of the holes and sealing of them.

Fig. 2 shows a modification of the present invention in which the pressure within pipe 2 is greater than it is outside thereof. In this figure the sealer unit comprises a tube 20 having axially spaced sleeves 21 attached thereto as by weld metal 22 and having tapered surfaces 23 at their remote ends. Elastic rings 24 engage the outer surface of tube 20 closely enough to prevent dislodgement during insertion of the unit into pipe 2 and have thickened portions 25 adjacent to the tapered surfaces 23. The remote ends 26 of rings 24 are thin, flexible and normally out of contact with the outer surface of tube 20. The sealing unit of Fig. 2 may be assembled in pipe 2 by any suitable means.

When the sealing unit of Fig. 2 is to be used for sealing hole I in pipe 2, the unit is moved into pipe 2 until rings 24 are on opposite sides of hole I. Then the pressure within pipe 2 is increased until it exceeds the pressure outside thereof. The effect of this increase in internal pressure is, first, to deflect the thin portions of rings 24 outwardly into substantially sealing contact with the inner surface of pipe 2, and then to move the rings axially so that the thickened portions 25 of rings 24 will move up the inclined surfaces 23 until they completely seal the space between sleeves 21 and pipe 2.

The above described action of rings 7 and 24 will be better understood by reference to Figs. 3, 4 and 5.

In Figs. 3, 4 and 5 tube 30 corresponds to tube 3 of Fig. 1 and tube 20 of Fig. 2, and pipe 2 is similar to pipes 2 of Figs. 1 and 2. Tube 30 has sleeves 31 threaded thereto at its ends (only one being shown) and each sleeve has a conical outer surface 32. Ring 33 of Fig. 3 corresponds generally to rings 7 and 24 of Figs. 1 and 2 and includes a thick portion 34 and a thin lip portion 35. As is shown in Fig. 3, a ring 33 is so shaped that when its inner surface engages the outer surface of tube 30, its outer surface near the thin portion 35 thereof will engage the inner surface of pipe 2. When the pressure inside tube 30 is less than it is outside of pipe 2 and a hole extends thru the wall of pipe 2 between two opposed rings 33, that pressure will first deflect the thin lip portion 35 of ring 33 into close fitting engagement with the inner surface of pipe 2, as is shown in Fig. 4. Then the exertion of pressure on the inner surface of ring 33 at the thin end thereof will force ring 33 axially along conical surface 32 until the ring is pressed tightly against the conical surface 32 and the opposed inner surface of pipe 2 and sealing contact is made. As shown in Fig. 5, part of the ring 33 has been forced beyond the base of the conical surface and into the space between the opposed cylindrical surfaces of sleeve 31 and pipe 2.

Fig. 6 shows a modification of the present invention in which the sealing unit is outside of a pipe having an opening to be sealed. In this figure the pipe 2 is surrounded by tube 40 which is connected at its ends, as by weld metal 41, to sleeve-like extensions 42 having conical inner surfaces 43. Elastic rings 44, which may be like ring 33 reversed, have thick portions 45 and thin lip portions 46. Initially rings 44 bear against the inner surface of tube 40 and also bear against the outer surface of pipe 2 near the bases of their thin portions 46. When the pressure is greater inside of pipe 2 than it is in the space defined by pipe 2, tube 40 and rings 44, the rings will be moved into sealing position between pipe 2 and extensions 42 in substantially the manner above described with respect to Figs. 3, 4 and 5.

The present invention is capable of use under a variety of conditions. For example, it may be used to seal off leaks in the side walls of casings in oil wells, brine wells, or water wells. It may also be used to seal off leaks in piping which is not accessible for examination or repair, for example, piping embedded in building walls, foundations and the like. Furthermore, it may be used to seal leaks which are not accessible and lie beyond a bend in the piping. In such instances the tube corresponding to tube 3 of Fig. 1, tube 20 of Fig. 2, or tubes 30 of Figs. 3 to 5 may consist of flexible tubing which would permit the unit to be moved in piping to positions beyond a bend in the pipe.

In certain instances only one elastic ring may be necessary and the other ring may be omitted. In such instances the other end of the tube carrying the ring may be sealed by conventional means or even left unsealed.

Sealers of this invention may also be used to connect together two pipes of different diameters. In that case the sealer would lie outside or inside of the two pipes and would span the space between their ends. The rings would correspond in size to the diameters of the pipes with which they cooperate.

Having thus described my invention so that others skilled in the art may be able to understand and practice the same, I state that what I desire to secure by Letters Patent is defined in what is claimed.

What is claimed is:

1. A fluid sealing unit, for sealing an opening in the cooperating wall of a pipe, comprising a tube having a conical surface and an elastic ring engageable with said conical surface, said ring having a portion at one end adjacent to said conical surface and of sufficient radial thickness to seal the space between said surface and the cooperating wall, said ring also having a thin portion at its other end and normally out of contact with said tube, said ring, when subjected to fluid pressure, being deformable at its thin end into contact with said cooperating wall and being movable axially into sealing engagement of its thick portion with said conical surface and the said wall.

2. A fluid sealing unit, for sealing an opening in the cooperating wall of a pipe or the like, comprising a tube for use in spaced telescopic relation to such a wall, conical surfaces upon said tube opposed to said wall, and elastic rings engageable with said surfaces and wall, each of said rings having a thick portion at one end adjacent to a conical surface and a thin end portion at the other end normally out of contact with said tube, said rings, when subjected to fluid pressure, being deformable at their thin ends into contact with said wall and being movable axially into sealing engagement of their thick portions with said wall and conical surfaces.

3. A fluid sealing unit, for sealing an opening in the cooperating wall of a pipe or the like, comprising a tube having axially spaced, conical surfaces diverging toward their remote ends and elastic rings engageable with said conical surfaces, said rings having thick portions at their remote ends and adjacent to said tube and conical surfaces and thin end portions at their adjacent ends and normally out of contact with said tube, said rings, when subjected to fluid pressure between said rings, being deformable at their thin end portions into contact with the opposed cooperating wall of a pipe or the like and being movable axially into sealing engagement of their thick portion with the said conical surfaces and said opposed wall.

4. A fluid sealing unit, for sealing an opening in a cooperating opposed wall of a pipe or vessel, comprising a tube having axially spaced, conical surfaces converging toward their remote ends and elastic rings engageable with said tube and conical surfaces, said rings having thick portions adjacent to said conical surfaces and thin portions at their remote ends and normally out of contact with said tube, said rings, when subjected to fluid pressure at their remote ends, being deformable into contact with the opposed wall of a pipe and being movable axially into sealing engagement of their thick portions with said conical surfaces and said opposed wall.

5. A fluid sealing unit, for sealing an opening in a cooperating opposed wall of a pipe or vessel, comprising a tube having an outer cylindrical surface and axially spaced conical surfaces opposed to the inner surface of such a wall, and elastic rings surrounding said tube, each ring having a thick portion at one end engaging said tube and wall, a thin portion at the other end normally out of contact with said tube, said rings, when subjected to fluid pressure at their thin ends, being deformable into contact with said inner surface of said pipe and being movable axially into sealing engagement of their thick portion with the said conical surfaces of the tube and the opposed inner surface of said wall.

6. A fluid sealing unit, for sealing an opening in the cooperating wall of a pipe or the like, comprising a member mounted in telescopic relation to said pipe and having axially spaced surfaces of engagement thereon and resilient rings slidably engaging said member and slidable onto said surfaces, said rings having portions normally thicker than the space between said surfaces of engagement and said wall and normally adjacent said surfaces and thin end portions remote from said surfaces, normally closer to said pipe than to said tube but out of contact with said wall and deformable upon application of fluid pressure into fluid sealing contact with said wall, said rings then being movable upon application of such pressure into sealing engagement of their thick portions between said surfaces and said cooperating wall.

7. Apparatus for sealing an opening in a conduit wall including an auxiliary conduit positioned in telescopic relation to said conduit wall, said auxiliary conduit having a resilient sealing ring slidably mounted thereon, said ring including portions of relatively thin cross section and portions of relatively thick cross section, and said auxiliary conduit including portions of such diameter as to provide between said conduit wall and said auxiliary conduit a zone having a width less than the thickness of said thick zone of said ring.

8. Apparatus for sealing an opening in a conduit wall including an auxiliary conduit, said auxiliary conduit slidably mounting resilient sealing rings at spaced points, said rings including portions of relatively thin cross section and portions of relatively thick cross section, and said auxiliary conduit including spaced zones of such diameter as to provide between said conduit wall and said auxiliary conduit spaced zones having less width than the thickness of said cross section portions of said ring.

9. A fluid sealing unit, for sealing an opening in the wall of a pipe or the like, comprising a tube positioned in telescopic relation to said pipe, said tube having a zone of diameter approaching that of said pipe, whereby the space between said pipe and said tube in said zone is less than the space between said pipe and said tube remote from said zone, a resilient sealing ring slidably mounted on said tube, said ring having a portion at one end of sufficient radial thickness to seal the space between said pipe and said tube in said zone of lesser space, said ring also having a thin portion at its other end and normally out of contact with said tube, said ring, when subjected to fluid pressure, being deformable at its thin end into contact with said wall of said pipe and being movable axially into sealing engagement of its thick portion in said zone of lesser space.

10. Apparatus for sealing an opening in a conduit wall including an auxiliary conduit positioned in telescopic relation to said conduit wall, said auxiliary conduit having a resilient sealing ring slidably mounted thereon, said ring including portions of relatively thin cross section and portions of relatively thick cross section, and said auxiliary conduit including portions of such diameter as to provide between said conduit wall and said auxiliary conduit a zone having a width less than the thickness of said thick zone of said ring, said ring, when subjected to fluid pressure, being deformable in its portion of relatively thin cross section into contact with said conduit wall, whereby said ring is moved into sealing engagement of its thick portion at said zone of a width less than its thickness.

CLARENCE A. BUTLER, Jr.

REFERENCES CITED

The following references are of record in the file of this patent:

UNITED STATES PATENTS

| Number | Name | Date |
|---|---|---|
| 672,955 | Murrin | Apr. 30, 1901 |
| 1,035,063 | Werner | Aug. 6, 1912 |
| 1,246,620 | Levy | Nov. 13, 19417 |
| 1,471,184 | Miles | Oct. 16, 1923 |
| 2,365,048 | Bruno | Dec. 12, 1944 |